United States Patent
Kim et al.

(10) Patent No.: US 7,224,177 B2
(45) Date of Patent: May 29, 2007

(54) APPARATUS AND METHOD FOR DETERMINING WHETHER MOTOR LOCK ERROR OCCURS IN SENSORLESS MOTOR

(75) Inventors: Tae Kyoung Kim, Seoul (KR); Soon Bae Yang, Yangchun-ku (KR); Kwan Yuhl Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 161 days.

(21) Appl. No.: 11/034,825

(22) Filed: Jan. 14, 2005

(65) Prior Publication Data
US 2005/0212548 A1 Sep. 29, 2005

(30) Foreign Application Priority Data
Mar. 24, 2004 (KR) ................. 10-2004-0020091

(51) Int. Cl.
*G01R 31/34* (2006.01)
(52) U.S. Cl. .................................................. 324/772
(58) Field of Classification Search ............ 324/158.1, 324/73.1, 545, 772; 318/432, 434, 626, 599, 318/466–469, 473; 388/907.5, 907, 909
See application file for complete search history.

(56) References Cited
U.S. PATENT DOCUMENTS
5,463,298 A * 10/1995 Kamio et al. ............... 318/599
6,333,617 B1 * 12/2001 Itabashi et al. ............. 318/801
6,639,374 B2 * 10/2003 Shimoyama ................ 318/560
6,870,344 B2 * 3/2005 Jinbo ......................... 318/609

FOREIGN PATENT DOCUMENTS
KR 10-2003-0012415 A 2/2003

* cited by examiner

*Primary Examiner*—Vinh P. Nguyen
(74) *Attorney, Agent, or Firm*—Birch, Stewart, Kolasch & Birch, LLP

(57) ABSTRACT

An apparatus and method for determining the presence or absence in a motor lock error in a sensorless motor. The method includes the steps of: driving the sensorless motor; determining whether or not a predetermined time elapses after the sensorless motor has been driven; measuring a current applied to the sensorless motor after the lapse of the predetermined time; calculating a difference between the measured current with a predetermined reference current; and determining the presence or absence of a motor lock error in the sensorless motor by determining whether the determined difference is equal to or higher than a predetermined reference difference, so that it quickly determines the presence or absence of a motor lock error in the sensorless motor without using a sensor and prevents an overcurrent from flowing in the sensorless motor, resulting in the prevention of a faulty operation or damage to the sensorless motor.

20 Claims, 4 Drawing Sheets

//<br>
APPARATUS AND METHOD FOR DETERMINING WHETHER MOTOR LOCK ERROR OCCURS IN SENSORLESS MOTOR

BACKGROUND OF THE INVENTION

1. Field of the Invention

The present invention relates to an apparatus and method for determining whether or not a motor lock error occurs in a sensorless motor, and more particularly to an apparatus and method for determining the presence or absence of a motor lock error in a sensorless BLDC (Blushless DC) motor using the magnitude of a current applied to the sensorless BLDC motor when determining a position and speed of the sensorless BLDC motor on the basis of the magnitudes of current and voltage signals applied to the sensorless BLDC motor.

2. Description of the Related Art

FIG. 1 is a block diagram illustrating a conventional sensorless motor drive system.

Typically, a motor comprised of a rotor and a stator determines a position and speed of the rotor to normally operate the rotor, and controls a voltage and current applied to the motor on the basis of the determined position and speed, such that it is able to control the rate of rotation of the rotor. Specifically, a method for mounting a sensor to the motor to determine the position and speed of the rotor has been widely used. The sensor mounted to the motor recognizes a rotation state of the motor at intervals of a predetermined time, determines a phase of the motor, detects the speed of the motor, and determines the presence or absence of a motor lock error in the motor, such that it can properly cope with a faulty operation of the motor.

However, the above-mentioned motor drive method for detecting the phase and speed of the motor using the sensor, and normally operating the motor on the basis of the detected phase and speed of the motor has a disadvantage in that it unavoidably increases the costs of production and the size of a circuit, and is unable to correctly recognize a rotation state of the motor when the sensor is damaged, so that it can correct the faulty operation of the motor.

Therefore, there has recently been widely used a sensorless motor drive system capable of detecting a position signal of the motor using voltage and current signals, instead of using the sensor. Operations of the above-mentioned sensorless motor drive system will hereinafter be described with reference to FIG. 1.

As shown in FIG. 1, the conventional sensorless motor drive system includes a rectifier unit 10 and an inverter unit 20. The rectifier unit 10 includes an AC power source; and a diode for receiving an AC voltage from the AC power source, and half-wave-rectifying the received AC voltage to a DC voltage. The inverter unit 20 includes six power components, each of which receives a voltage from a capacitor in which a voltage rectified by the rectifier unit 10 is charged, converts the received voltage into a three-phase AC voltage, and outputs the three-phase AC voltage to a motor 30.

The above-mentioned sensorless motor drive system includes a main controller 40 and a gate signal processor 50. The main controller 40 includes a position detector 41 for detecting a voltage and current transmitted from the inverter unit 20 to the motor 30, calculating a rotor position on the basis of the detected voltage and current, and generating a position detection signal; and a speed controller 42 for determining a voltage of each phase so as to allow the motor 30 to be optimally operated by the position detection signal generated from the position detector 41, and generating a control signal. The gate signal processor 50 receives the output signal from the speed controller 42, and converts the received signal into a potential capable of being used as an input signal of each power component.

According to operations of the above-mentioned conventional sensorless motor drive system, the rectifier unit 10 rectifies an AC input voltage to a DC voltage, the rectified voltage is charged in the capacitor, and is converted into a three-phase AC voltage by the inverter unit 20 comprised of 6 power components. The three-phase AC voltage is received in the motor 30 so that the rotor of the motor 30 is rotated.

The inverter unit 20 is controlled by the control signal generated from the main processor 40. The main processor 40 includes the position detector 41 and the speed controller 42 so as to optimally operate the motor. The position detector 41 detects voltage and current signals applied to the motor 30, detects a rotor position of the motor 30, and transmits a position detection signal.

The speed controller 42 determines and outputs voltages of individual phases using the position detection signal so that a current suitable for the rotor position flows in the motor 30. The gate signal processor 50 receives the output signal from the speed controller 42, and converts the received signal into a potential capable of being used as an input signal of each power component contained in the inverter unit 20.

According to the above-mentioned conventional art, a rotor position and rotation rate of the sensorless motor can be detected without using the sensor so that the operation of the rotor is corrected so as to allow the motor to be optimally operated. However, if a motor lock error unexpectedly occurs in the above-mentioned sensorless motor, there is no solution capable of correcting the motor lock error in the sensorless motor drive system.

In more detail, provided that a motor lock error occurs because a rotor is rotated at a rate less than a normal rotation rate even though a current flows in the motor, the position of the rotor is erroneously calculated, and each phase voltage flowing in the motor is abnormally controlled by the erroneously-calculated rotor position, so that an overcurrent flows in the motor. Particularly, if the motor lock error is generated when the motor is mounted to a washing machine, an overcurrent flows in the motor, so that a temperature of the motor is increased and the motor or overall system is damaged.

Also, if a washing machine capable of preventing the motor lock error from being generated to solve the above-mentioned problem of the damage of the motor or system detects the motor lock error, it includes a means for compulsorily turning off a power source applied to the washing machine itself, instead of including a means for correcting the motor lock error to perform a normal washing mode, so that the washing mode is not fully performed and incompletely terminated, resulting in greater inconvenience of users.

SUMMARY OF THE INVENTION

Therefore, the present invention has been made in view of the above problems, and it is an object of the present invention to provide an apparatus and method for determining the presence or absence of a motor lock error in a sensorless motor, which determines the presence or absence of the motor lock error in the sensorless motor on the basis of the magnitude of a current applied to the motor, corrects the determined motor lock error so as to guarantee a stable drive operation of the motor, and is capable of completely performing a washing process of a washing machine even though the motor lock error is generated when the motor is mounted to the washing machine.

In accordance with one aspect of the present invention, the above and other objects can be accomplished by the provision of a method for determining the presence or absence of a motor lock error in a sensorless motor, comprising the steps of: a) compulsorily arranging the sensorless motor to a predetermined position, determining whether or not a predetermined time elapses, and measuring a current applied to the sensorless motor after the lapse of the predetermined time; b) calculating a difference between the measured current with a predetermined reference current; and c) determining the presence of the motor lock error in the sensorless motor if the calculated difference is equal to or higher than a predetermined reference difference α, and controlling the sensorless motor to be normally operated.

Preferably, the method may further include the steps of: determining the presence of the motor lock error in the sensorless motor if the calculated difference is equal to or higher than the predetermined reference difference α; performing the motor control step; initializing data measured at each of the steps (a)~(c), and redetermining whether the motor lock error occurs in the sensorless motor.

Preferably, the method may further include the step of: rotating the sensorless motor according to a predetermined process mode if the calculated difference is less than the predetermined reference difference α at the step (c).

In accordance with another aspect of the present invention, there is provided a method for determining the presence or absence of a motor lock error in a sensorless motor, comprising the steps of: a) compulsorily arranging the sensorless motor to a predetermined position, determining whether or not a predetermined time elapses, and measuring a current applied to the sensorless motor after the lapse of the predetermined time; b) calculating a difference between the measured current with a predetermined reference current; c) comparing the calculated difference with a predetermined reference difference α, and determining whether the calculated difference is equal to or higher than the predetermined reference difference α is generated; and d) determining the presence of the motor lock error in the sensorless motor if there arises a specific state in which the calculated difference is equal to or higher than the predetermined reference difference α and the specific state is maintained during a predetermined time (t), and controlling the sensorless motor to be normally operated.

Preferably, the method may further include the step of: performing the motor control step by determining the presence of the motor lock error in the sensorless motor at the step (d), initializing data measured at each of the steps (a)~d), and redetermining whether the motor lock error occurs in the sensorless motor.

Preferably, the method may further include the steps of: determining the absence of the motor lock error in the sensorless motor if there arises a specific state in which the calculated difference is less than the predetermined reference difference α and the specific state is maintained during a predetermined time (t), and rotating the sensorless motor according to a predetermined process mode.

In accordance with yet another aspect of the present invention, there is provided an apparatus for determining the presence or absence of a motor lock error in a sensorless motor, comprising: a rectifier unit for receiving an AC voltage from an AC power source, and rectifying the received AC voltage to a DC voltage; an inverter unit for receiving the rectified voltage from the rectifier unit, and converting the received rectified voltage into a three-phase AC voltage; a main controller for detecting voltage and current signals transmitted from the inverter unit to the sensorless motor, determining a rotor position of the sensorless motor and the presence or absence of the motor lock error in the sensorless motor, and generating a control signal to control operations of the sensorless motor; and a gate signal processor for receiving the control signal from the main controller, and converting the received control signal into a potential capable of being used as an input signal of the inverter unit.

Preferably, the main controller may include: a position detector for detecting voltage and current signals applied to the sensorless motor, and detecting a rotor position of the sensorless motor; a current comparator for detecting the current applied to the sensorless motor, and comparing the magnitude of the detected current with the magnitude of a predetermined reference current; and a speed controller for receiving individual output signals from the position detector and the current comparator, and generating a control signal for controlling a drive operation of the sensorless motor.

Preferably, the current comparator compares the magnitude of the current applied to the sensorless motor with the magnitude of the predetermined reference current, determines whether a difference between the current applied to the sensorless motor and the predetermined reference current is equal to or higher than a predetermined reference difference α, and outputs a motor lock error signal to the speed controller (143) if the determined difference is equal to or higher than the predetermined reference difference α. Preferably, the current comparator compares the magnitude of the current applied to the sensorless motor with the magnitude of predetermined reference current, and outputs a motor lock error signal to the speed controller if there arises a specific state in which a difference between the current applied to the sensorless motor and the predetermined reference current is equal to or higher than a predetermined reference difference α and the specific state is maintained during a predetermined time (t).

Preferably, the apparatus for determining the presence or absence of the motor lock error in the sensorless motor is mounted to a second sensorless motor for use in a washing machine such that it determines the presence or absence of a motor lock error in the second sensorless motor mounted to the washing machine.

If the above-mentioned apparatus is applied to the second sensorless motor for use in the washing machine, it recognizes state information of the second sensorless motor, determines the presence or absence of a motor lock error in the second sensorless motor, and controls the second sensorless motor to be normally operated even though the presence of the motor lock error is determined, such that it can allow a washing mode of the washing machine to be normally operated without the occurrence of any errors.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
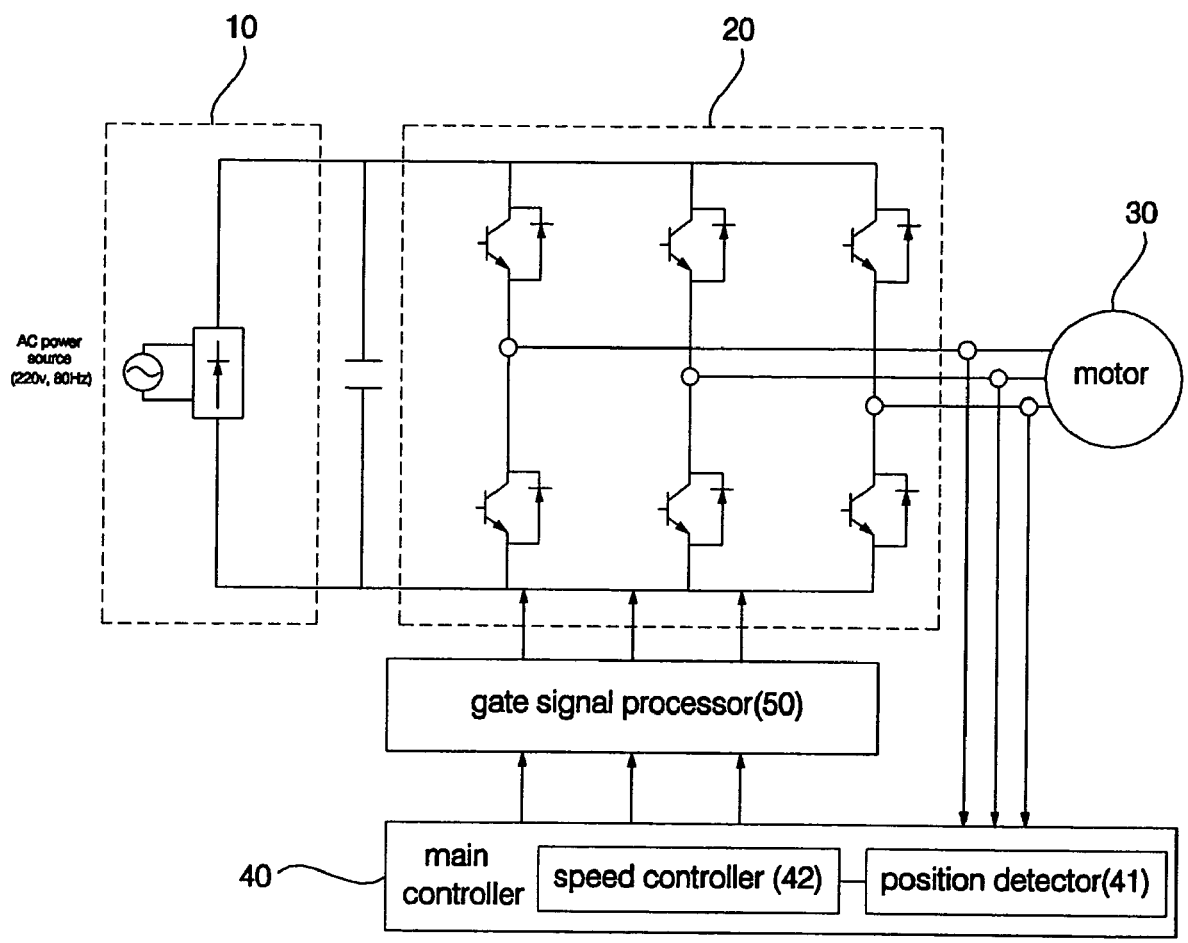
FIG. 1 is a block diagram illustrating a conventional sensorless motor drive system.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

Figure 2:
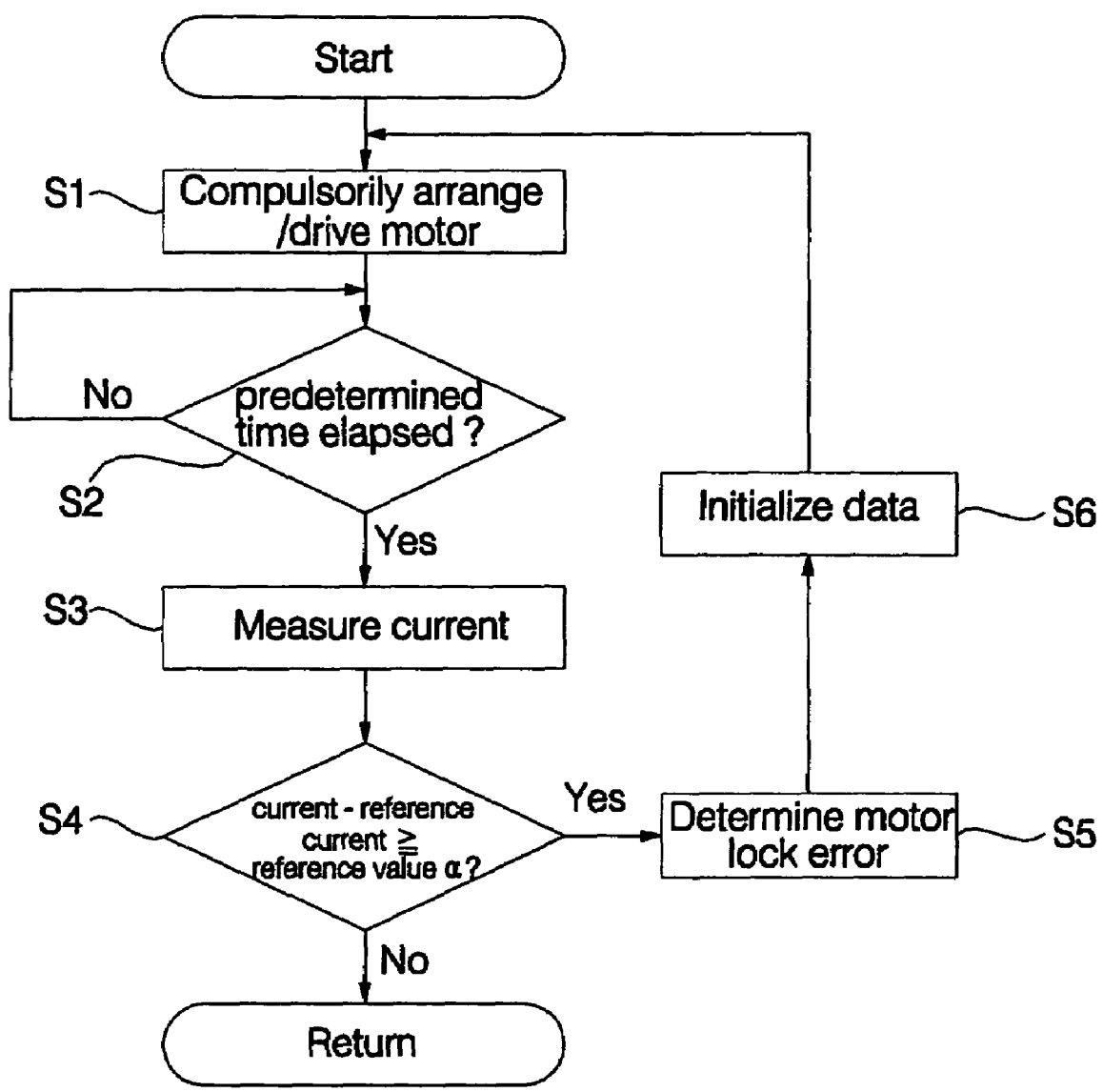
FIG. 2 is a flow chart illustrating a method for determining the presence or absence of a motor lock error in a sensorless motor in accordance with a preferred embodiment of the present invention.

FIG. 2 is a flow chart illustrating a method for determining the presence or absence of a motor lock error in a sensorless motor in accordance with a preferred embodiment of the present invention.

Referring to FIG. 2, according to the method for determining the presence or absence of a motor lock error in the sensorless motor, the motor is compulsorily arranged at a predetermined position and begins its operation, such that the motor can be operated according to a predetermined process at step S1.

If a power source is applied to the motor so as to allow the motor to begin its operation, voltage and current signals applied to the motor are detected so that a variety of motor states such as the position or speed of the motor can be recognized. The signal indicative of the motor states is transmitted to a controller for controlling the operation of the motor. The controller compulsorily arranges the motor to a predetermined position using the received motor state signal.

Thereafter, if the motor startup operation is performed, the controller determines whether a predetermined time has elapsed on the basis of the motor startup time at step S2, such that it can measure a motor input current compared with a predetermined reference current.

If it is determined that the predetermined time has not elapsed, the controller does not perform the following steps used for determining the presence or absence of a motor lock error and enters a standby mode until reaching the predetermined time. Otherwise, if it is determined that the present invention time has elapsed, the current applied to the motor so as to rotate the motor is measured at step S3.

In more detail, since the current applied to the motor is freely changed in a variety of process modes of the motor, it is necessary for the controller to compare a current applied to the motor with a reference current at a specific time selected from among the process modes of the motor in such a way that the controller must determine whether the motor is normally operated or not. As can be seen from the above descriptions, in the case of the above-mentioned step for determining whether or not a predetermined time elapses on the basis of a specific time at which the motor is compulsorily arranged and driven, a standby mode is provided until reaching the predetermined time if it is determined that the predetermined time has not elapsed, and the current applied to the motor after the lapse of the predetermined time can be measured if it is determined that the predetermined time has elapsed.

After measuring the current applied to the motor, the controller compares the measured current with the predetermined reference current, and calculates a difference between the measured current and the predetermined reference current at step S4, so that it can determine whether the magnitude of the current applied to the motor is indicative of a current magnitude matched with a predetermined motor process mode.

In order to determine whether the calculated current difference is different from a predetermined allowed current difference generable by each process mode of the motor, the controller compares the calculated current difference with a predetermined reference current difference α at step S4. In this case, if it is determined that the calculated current difference is equal to or higher than the reference current difference α at step S4, the controller determines the presence of the motor lock error at step S5.

If the presence of the motor lock error is determined at step S5, a control signal generated from a main controller capable of controlling operations of the motor allows a rotor of the motor having the motor lock error to be normally operated, such that a faulty operation or damage to the motor due to the continuation of the motor lock error can be prevented.

The above-mentioned method for determining the presence or absence of the motor lock error in the sensorless motor further includes the step (S6) for initializing data measured at individual steps after performing the motor control process by the control signal generated by the motor lock error, such that it can redetermine whether the motor lock error occurs in the sensorless motor.

In more detail, the above-mentioned method for determining the presence or absence of the motor lock error in the sensorless motor initializes data indicative of a previously-measured current, determines whether a predetermined time has elapsed, re-measures a current applied to the motor, and compares the newly-measured current with the reference current, such that it can redetermine whether the presence or absence of the motor lock error in the sensorless motor. As a result, although the motor lock error occurs in the sensorless motor several times, the method detects the plurality of motor lock errors so that it allows the motor to be normally operated.

In the meantime, if it is determined that the current difference is less than the reference current difference α at step S4, the motor is rotated according to a predetermined process mode, such that unnecessary control operations of the motor can be prevented.

Figure 3:
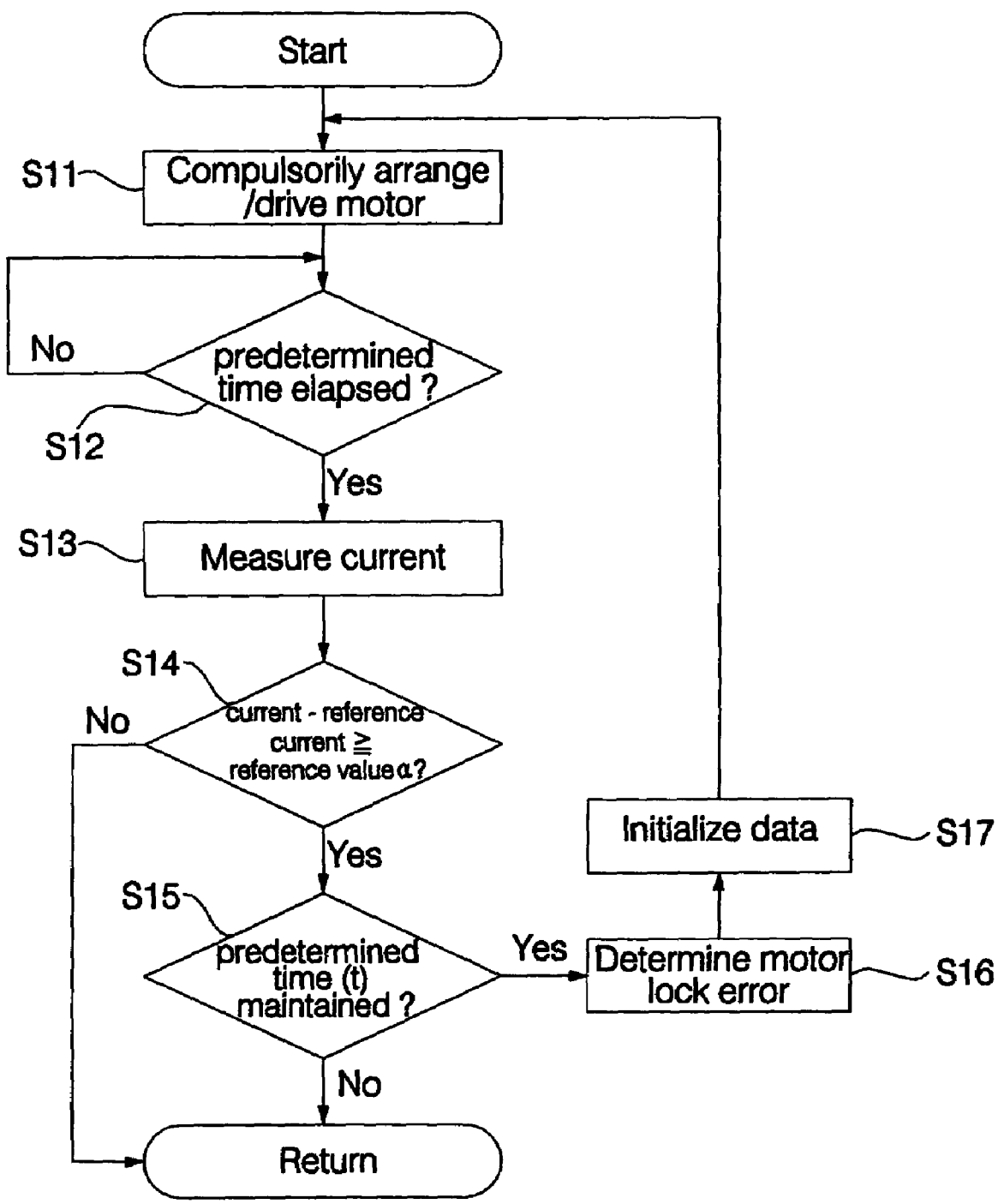
FIG. 3 is a flow chart illustrating a method for determining the presence or absence of a motor lock error in a sensorless motor in accordance with another preferred embodiment of the present invention.

FIG. 3 is a flow chart illustrating a method for determining the presence or absence of a motor lock error in a sensorless motor in accordance with a second preferred embodiment of the present invention.

Initial operations of the method for determining the presence or absence of a motor lock error in a sensorless motor according to the second preferred embodiment of the present invention will hereinafter be described with reference to FIG. 3. In the same manner as in the aforementioned first preferred embodiment of the present invention, the method for determining the presence or absence of the motor lock error in the sensorless motor according to the second preferred embodiment includes the steps of: compulsorily arranging the motor at a predetermined position, and performing a startup operation of the motor so that the motor can be operated according to a predetermined process mode (S11); determining whether or not a predetermined time elapses on the basis of the motor startup time so that an input current of the motor can be measured (S12); measuring a motor input current for rotating the motor if it is determined that the predetermined time has elapsed (S13); and calculating a difference between the measured current and a predetermined reference current, and comparing the calculated current difference with a predetermined reference current difference α (S14).

If it is determined that the calculated current difference is equal to or higher than the predetermined reference current difference α at step S14, the above-mentioned method for determining the presence or absence of the motor lock error in the sensorless motor according to the second preferred embodiment of the present invention further includes the steps of: determining (S15) whether the above-mentioned state in which the calculated current difference is equal to or higher than the predetermined reference current difference α is maintained during a predetermined time (t); and determining (S16) the presence of the motor lock error if it is determined that the above-mentioned state is maintained during the predetermined time (t), so that it controls the motor to be normally operated.

After performing the above-mentioned motor control steps according to the second preferred embodiment of the present invention, the above-mentioned method for determining the presence or absence of the motor lock error in the sensorless motor according to the second preferred embodiment may further include the step of initializing (S17) data measured at individual steps so that it can redetermine the presence or absence of the motor lock error using the initialized data, in the same manner as in the first preferred embodiment of the present invention.

Otherwise, if it is determined that the calculated current difference is less than the predetermined reference current difference α at step S14, the above-mentioned method for determining the presence or absence of the motor lock error in the sensorless motor according to the second preferred embodiment controls the motor to be rotated according to a predetermined process mode. Particularly, if there arises a specific state in which the calculated current difference is equal to or higher than the predetermined reference current difference α, and the specific state is not maintained during the predetermined time (t), it is determined that there is no motor lock error in the motor so that the motor is rotated according to a predetermined process mode.

The above-mentioned method for determining the presence or absence of the motor lock error in the sensorless motor according to the second preferred embodiment can also be applied to a motor for use in a washing machine, such that it can prevent the problem of a washing mode from being generated by a motor lock error generated in the motor for use in the washing machine.

In order words, if it is determined that the motor lock error occurs in the motor for use in the washing machine, a control signal is generated so as to allow the motor to be normally operated, so that operations of the motor can be corrected. As a result, the above-mentioned method for determining the presence or absence of the motor lock error in the sensorless motor can solve the conventional problem in which the washing machine is compulsorily turned off to provide against the motor lock error so that a washing mode is incompletely terminated on the condition that the washing mode is not fully performed.

Figure 4:
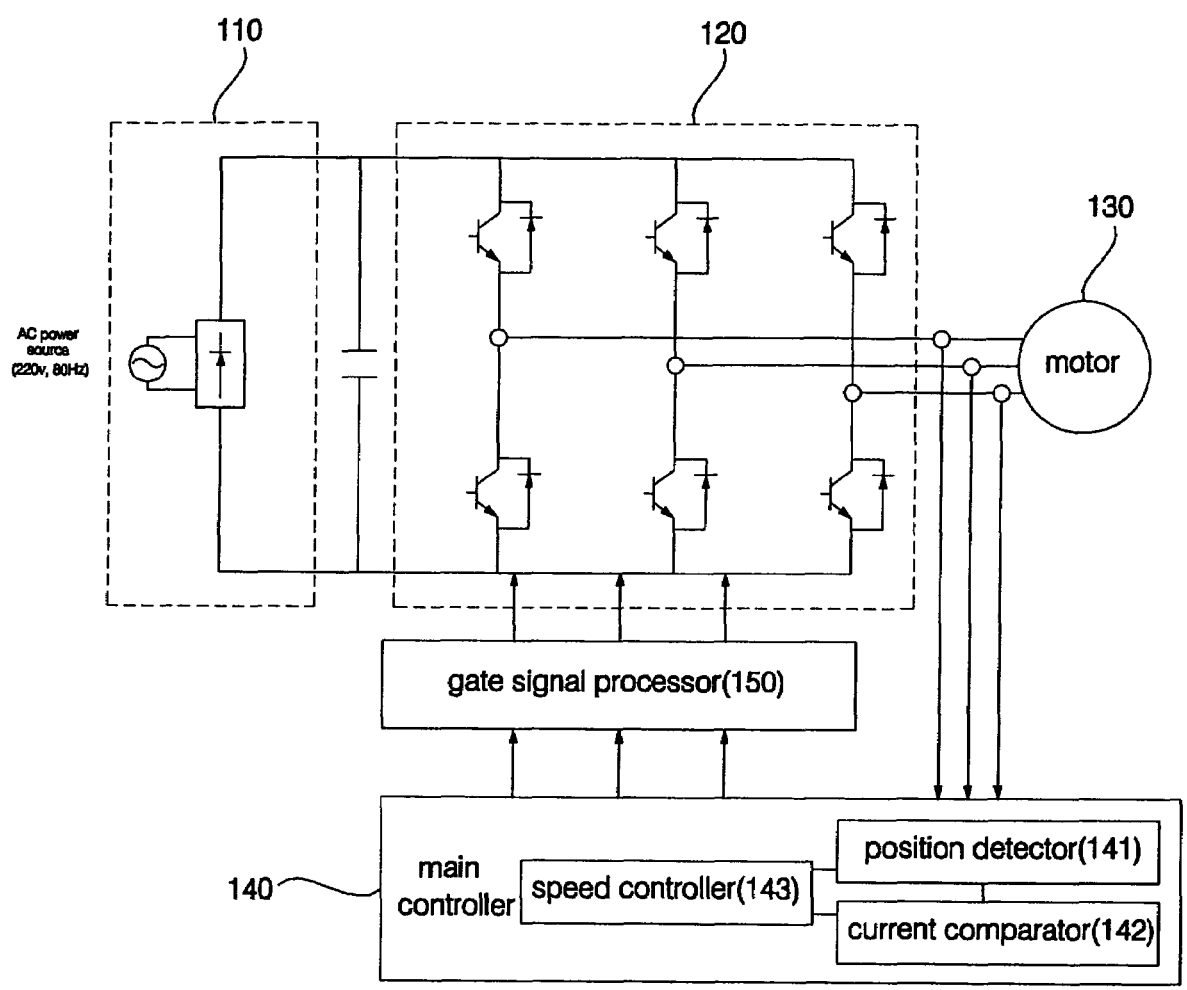
FIG. 4 is a block diagram illustrating a sensorless motor drive system including a device for determining the presence or absence of a motor lock error in accordance with the present invention.

FIG. 4 is a block diagram illustrating a sensorless motor drive system including a device for determining the presence or absence of a motor lock error in accordance with the present invention.

As shown in FIG. 4, an apparatus for determining the presence or absence of a motor lock error in the sensorless motor includes a rectifier unit 110, an inverter unit 120, a main controller 140, and a gate signal processor 150. The rectifier unit 110 receives an AC voltage from an AC power source, and rectifies the received AC voltage to a DC voltage. The inverter unit 120 receives the rectified voltage from the rectifier unit 110, and converts the received rectified voltage into a three-phase AC voltage. The main controller 140 detects voltage and current signals transmitted from the inverter unit 120 to the motor 130, determines a rotor position of the motor 130 and the presence or absence of the motor lock error in the sensorless motor, and generates a control signal to control operations of the motor 130. The gate signal processor 150 receives the control signal from the main controller 140, and converts the received control signal into a potential capable of being used as an input signal of the inverter unit 120.

The main controller 140 includes a position detector 141, a current comparator 142, and a speed controller 143. The position detector 141 detects voltage and current signals applied to the motor 130, and detects a rotor position of the motor 130. The current comparator 142 detects the current applied to the motor 130, and compares the magnitude of the detected current with the magnitude of a predetermined reference current. The speed controller 143 receives individual output signals from the position detector 141 and the current comparator 142, and generates a control signal for controlling a drive operation of the motor 130.

The above-mentioned apparatus for determining the presence or absence of the motor lock error in the sensorless motor measures a current applied to the motor using the current comparator 142. The current comparator 142 compares the measured current with the predetermined reference current, calculates a difference between the measured current and the predetermined reference current, and determines whether the calculated current difference is equal to or higher than a predetermined reference current difference α.

If the calculated current difference is equal to or higher than the predetermined reference current difference α so that the motor 130 is determined to be in a motor lock error state, this means that the motor 130 is slowly rotated at a rotation rate less than a reference rotation rate by a predetermined value. If the motor 130 is abnormally rotated by the motor lock error generated in the motor 130, the main controller 140 determines the position of the motor 130, and limits the current flowing in the motor 130 to a predetermined current value so as to increase the rotation rate of the motor 130.

Therefore, if the motor lock error occurs in the sensorless motor, the current applied to the motor is measured to be higher than a reference current by more than a predetermined value, so that the current comparator 142 compares the current applied to the motor with the reference current. In this case, the current comparator 142 determines whether the difference between the current applied to the motor and the reference current is equal to or higher than a predetermined reference current difference α, or determines whether a specific state in which the difference between the current applied to the motor and the reference current is equal to or higher than the predetermined reference current difference α is maintained during a predetermined time (t), so that it can determine the presence or absence of a motor lock error in the sensorless motor.

In this manner, the current comparator 142 determines the presence or absence of the motor lock error in the motor 130 using current-associated data. If the motor lock error occurs in the motor 130, the current comparator 142 outputs a motor lock error signal to the speed controller 143, and the speed controller 143 outputs a speed control signal to the inverter unit 120 via the gate signal processor 150, so that it can control the speed of the motor 130.

The above-mentioned apparatus for determining the presence or absence of the motor lock error in the sensorless motor can also be applied to a sensorless motor for use in a washing machine. Therefore, although the motor lock error occurs in the sensorless motor for use in the washing machine, the above-mentioned apparatus controls the motor to be normally operated, so that it can allow a washing mode of the washing machine to be normally operated without the occurrence of any errors.

As apparent from the above description, the apparatus and method for determining the presence or absence of a motor lock error in a sensorless motor according to the present invention quickly determines the presence or absence of the motor lock error using the magnitude of a current applied to the motor without using a position sensor, and quickly copes with the determined motor lock error, so that it prevents an overcurrent applied to the motor for a long period from being generated, resulting in the prevention of a faulty operation or damage to the motor.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for determining the presence or absence of a motor lock error in a sensorless motor, comprising the steps of:
    a) compulsorily arranging the sensorless motor to a predetermined position, determining whether or not a predetermined time elapses, and measuring a current applied to the sensorless motor after the lapse of the predetermined time;
    b) calculating a difference between the measured current with a predetermined reference current; and
    c) determining the presence of the motor lock error in the sensorless motor if the calculated difference is equal to or higher than a predetermined reference difference $\alpha$, and controlling the sensorless motor to be normally operated.

2. The method as set forth in claim 1, further comprising the step of:
    after performing the motor control step by determining the presence of the motor lock error in the sensorless motor at the step (c), initializing data measured at each of the steps (a)~(c), and redetermining whether the motor lock error occurs in the sensorless motor.

3. The method as set forth in claim 1, further comprising the step of:
    rotating the sensorless motor according to a predetermined process mode if the calculated difference is less than the predetermined reference difference $\alpha$ at the step (c).

4. A method for determining the presence or absence of a motor lock error in a sensorless motor, comprising the steps of:
    a) compulsorily arranging the sensorless motor to a predetermined position, determining whether or not a predetermined time elapses, and measuring a current applied to the sensorless motor after the lapse of the predetermined time;
    b) calculating a difference between the measured current with a predetermined reference current;
    c) comparing the calculated difference with a predetermined reference difference $\alpha$, and determining whether the calculated difference is equal to or higher than the predetermined reference difference $\alpha$ is generated; and
    d) determining the presence of the motor lock error in the sensorless motor if there arises a specific state in which the calculated difference is equal to or higher than the predetermined reference difference $\alpha$ and the specific state is maintained during a predetermined time (t), and controlling the sensorless motor to be normally operated.

5. The method as set forth in claim 4, further comprising the step of:
    after performing the motor control step by determining the presence of the motor lock error in the sensorless motor at the step (d), initializing data measured at each of the steps (a)~d), and redetermining whether the motor lock error occurs in the sensorless motor.

6. The method as set forth in claim 4, further comprising the step of:
    rotating the sensorless motor according to a predetermined process mode if the calculated difference is less than the predetermined reference difference $\alpha$ at the step (c).

7. The method as set forth in claim 4, further comprising the step of:
    rotating the sensorless motor according to a predetermined process mode if the specific state in which the calculated difference is equal to or higher than the predetermined reference difference $\alpha$ is not maintained during the predetermined time (t) at the step (d).

8. An apparatus for determining the presence or absence of a motor lock error in a sensorless motor, comprising:
    a rectifier unit for receiving an AC voltage from an AC power source, and rectifying the received AC voltage to a DC voltage;
    an inverter unit for receiving the rectified voltage horn the rectifier unit, and converting the received rectified voltage into a three-phase AC voltage;
    a main controller for detecting voltage and current signals transmitted from the inverter unit to the sensorless motor, determining a rotor position of the sensorless motor and the presence or absence of the motor lock error in the sensorless motor, and generating a control signal to control operations of the sensorless motor, determining a rotor position of the sensorless motor and the presence or absence of the motor lock error in the sensorless motor by comparing the magnitude of the detected current with the magnitude of a predetermined reference current, and generating a control signal to control operations of the sensorless motor; and
    a gate signal processor for receiving the control signal from the main controller, and converting the received control signal into a potential capable of being used as an input signal of the inverter unit.

9. The apparatus as set forth in claim 8, wherein the main controller includes:
    a position detector for detecting voltage and current signals applied to the sensorless motor, and detecting a rotor position of the sensorless motor;
    a current comparator for detecting the current applied to the sensorless motor, and comparing the magnitude of the detected current with the magnitude of a predetermined reference current; and a speed controller for receiving individual output signals from the position detector and the current comparator, and generating a control signal for controlling a drive operation of the sensorless motor.

10. The apparatus as set forth in claim 9, wherein:

the current comparator compares the magnitude of the current applied to the sensorless motor with the magnitude of the predetermined reference current, determines whether a difference between the current applied to the sensorless motor and the predetermined reference current is equal to or higher than a predetermined reference difference a, and outputs a motor lock error signal to the speed controller if the determined difference is equal to or higher than the predetermined reference difference $\alpha$.

11. The apparatus as set forth in claim 9, wherein:

the current comparator compares the magnitude of the current applied to the sensorless motor with the magnitude of predetermined reference current, and outputs a motor lock error signal to the speed controller if there arises a specific state in which a difference between the current applied to the sensorless motor and the predetermined reference current is equal to or higher than a predetermined reference difference a and the specific state is maintained during a predetermined time (t).

12. The apparatus as set forth in claim 8, wherein the sensorless motor a washing machine motor mounted to a washing machine.

13. The apparatus as set forth in claim 12, wherein the main controller includes:

a position detector for detecting voltage and current signals applied to the sensorless motor, and detecting a rotor position of the sensorless motor;

a current comparator for detecting the current applied to the sensorless motor, and comparing the magnitude of the detected current with the magnitude of a predetermined reference current; and a speed controller for receiving individual output signals from the position detector and the current comparator, and generating a control signal for controlling a drive operation of the sensorless motor.

14. The apparatus as set forth in claim 13, wherein:

the current comparator compares the magnitude of the current applied to the sensorless motor with the magnitude of the predetermined reference current, determines whether a difference between the current applied to the sensorless motor and the predetermined reference current is equal to or higher than a predetermined reference difference $\alpha$, and outputs a motor lock error signal to the speed controller if the determined difference is equal to or higher than the predetermined reference difference $\alpha$.

15. The apparatus as set forth in claim 13, wherein:

the current comparator compares the magnitude of the current applied to the sensorless motor with the magnitude of predetermined reference current, and outputs a motor lock error signal to the speed controller if there arises a specific state in which a difference between the current applied to the sensorless motor and the predetermined reference current is equal to or higher than a predetermined reference difference a and the specific state is maintained during a predetermined time (t).

16. An apparatus which determines the presence or absence of a motor lock error in a sensorless motor, comprising:

a rectifier unit which receives an AC voltage from an AC power source, and rectifies the received AC voltage to a DC voltage;

an inverter unit which receives the rectified voltage from the rectifier unit, and converts the received rectified voltage into a three-phase AC voltage;

a main controller which detects voltage and current signals transmitted from the inverter unit to the sensorless motor, determines a rotor position of the sensorless motor and the presence or absence of the motor lock error in the sensorless motor by comparing the magnitude of the detected current with the magnitude of a predetermined reference current, and generates a control signal to control operations of the sensorless motor; and a gate signal processor which receives the control signal from the main controller, and converts the received control signal into a potential capable of being used as an input signal of the inverter unit.

17. The apparatus as set forth in claim 16, wherein the main controller includes:

a position detector for detecting voltage and current signals applied to the sensorless motor, and detecting a rotor position of the sensorless motor;

a current comparator for detecting the current applied to the sensorless motor, and comparing the magnitude of the detected current with the magnitude of a predetermined reference current; and a speed controller for receiving individual output signals from the position detector and the current comparator, and generating a control signal for controlling a drive operation of the sensorless motor.

18. The apparatus as set forth in claim 17, wherein:

the current comparator compares the magnitude of the current applied to the sensorless motor with the magnitude of the predetermined reference current, determines whether a difference between the current applied to the sensorless motor and the predetermined reference current is equal to or higher than a predetermined reference difference a, and outputs a motor lock error signal to the speed controller if the determined difference is equal to or higher than the predetermined reference difference $\alpha$.

19. The apparatus as set forth in claim 17, wherein:

the current comparator compares the magnitude of the current applied to the sensorless motor with the magnitude of predetermined reference current, and outputs a motor lock error signal to the speed controller if there arises a specific state in which a difference between the current applied to the sensorless motor and the predetermined reference current is equal to or higher than a predetermined reference difference a and the specific state is maintained during a predetermined time (t).

20. The apparatus as set forth in claim 16, wherein the apparatus for determining the presence or absence of the motor lock error in the sensorless motor is mounted to a second sensorless motor for use in a washing machine such that it determines the presence or absence of a motor lock error in the second sensorless motor mounted to the washing machine.

* * * * *